United States Patent [19]

Ito

[11] Patent Number: 5,702,155
[45] Date of Patent: Dec. 30, 1997

[54] POWER RECLINNING DEVICE FOR A SEAT

[75] Inventor: Sadao Ito, Anjyo, Japan

[73] Assignee: Aisin Seiki Kabushiki Kaisha, Japan

[21] Appl. No.: 508,337

[22] Filed: Jul. 27, 1995

[30] Foreign Application Priority Data

Jul. 29, 1994 [JP] Japan .................. 6-178251

[51] Int. Cl.$^6$ .................................................. B60N 2/02
[52] U.S. Cl. ............................... 297/362.11; 297/362
[58] Field of Search ........................ 297/362.11, 362, 297/361.1, 354.12, 354.1

[56] References Cited

U.S. PATENT DOCUMENTS 4,986,514  1/1991  Ikegaya et al. ................... 297/362

FOREIGN PATENT DOCUMENTS 63-155465  10/1988  Japan .
5-46345  6/1993  Japan .

*Primary Examiner*—Milton Nelson, Jr.
*Attorney, Agent, or Firm*—Finnegan, Henderson, Farabow, Garrett & Dunner, L.L.P.

[57] ABSTRACT

A power reclining device for use in a seat includes a reclining mechanism for adjusting a tilt angle of a seat back frame with respect to a seat cushion frame and a pre-assembled power unit having a gear train. The pre-assembled power unit has a hole for receiving an end of a rotating shaft of the reclining mechanism when it is attached to a lower arm of the seat, whereby a gear train is established for a smooth transmission of rotational torque from an electric motor to the rotating shaft.

6 Claims, 5 Drawing Sheets

POWER RECLINNING DEVICE FOR A SEAT

BACKGROUND OF THE INVENTION

The present invention relates to a power reclining device for use in an automotive seat.

A power reclining device for tilting a seat back forwardly or rearwardly with respect to a seat cushion is well known. For example, Japanese Utility Model Laid Open Publication (KOKAI) No. 46345/1993 discloses a power reclining device comprising a lower arm secured to a seat cushion frame, an upper arm secured to a seat back frame, a rotating shaft for pivoting the upper arm with respect to the lower arm, an internal gear provided on the upper arm, an electric motor, a reduction gear set interposed between an output shaft of the electric motor and the internal gear of the upper arm, and a bracket secured to the upper arm for holding the electric motor. In this case, the electric motor and the reduction gear set is accommodated in a housing as one unit and this united drive means is fixed to the bracket which is secured to the upper arm, so that the output gear of the united drive means may not properly mesh with an input gear associated with the internal gear of the upper arm if the bracket is not positioned at a proper location with respect to the rotating shaft or a large play appears between the bracket and the united drive means when assembled. This results in producing oscillation and noise which give uncomfortable feeling to an occupant.

SUMMARY OF THE INVENTION

The present invention has been developed to solve the afore-mentioned problem in the prior art and provide a new power reclining device which does not use a bracket for securing an electric motor to an upper arm as a reference member for location of an output shaft of the electric motor. The power reclining device of the present invention generally includes a housing in which the electric motor and a reduction gear set are accommodated, and a bearing means located in the housing and receiving an end of a rotating shaft for rotatably supporting the upper arm with respect to a lower arm.

To achieve the objects and in accordance with the purpose of the invention, as embodied and broadly described herein, the power reclining device of this invention comprises a lower arm secured to a side rear portion of a seat cushion frame, an upper arm secured to a side lower portion of a seat back frame, a reclining mechanism for tilting the upper arm with respect to the lower arm, the reclining mechanism having a rotating shaft which passes through both arms, the rotating shaft having a first end and a first axis, a pre-assembled driving mechanism for operating the reclining mechanism including an electric motor, reduction gearing connected to the electric motor, an intermediate shaft connected to the reduction gearing and having a second end and a second axis, and a single support member having a first hole to support the first end of the rotating shaft and a second hole to support the second end of the intermediate shaft, a pinion gear secured to the intermediate shaft, and an input gear secured to the rotating shaft and meshing with the pinion gear, wherein a predetermined distance between the first axis of the rotating shaft and the second axis of the intermediate shaft is defined by the support member so as to mesh precisely the input gear with the pinion gear.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
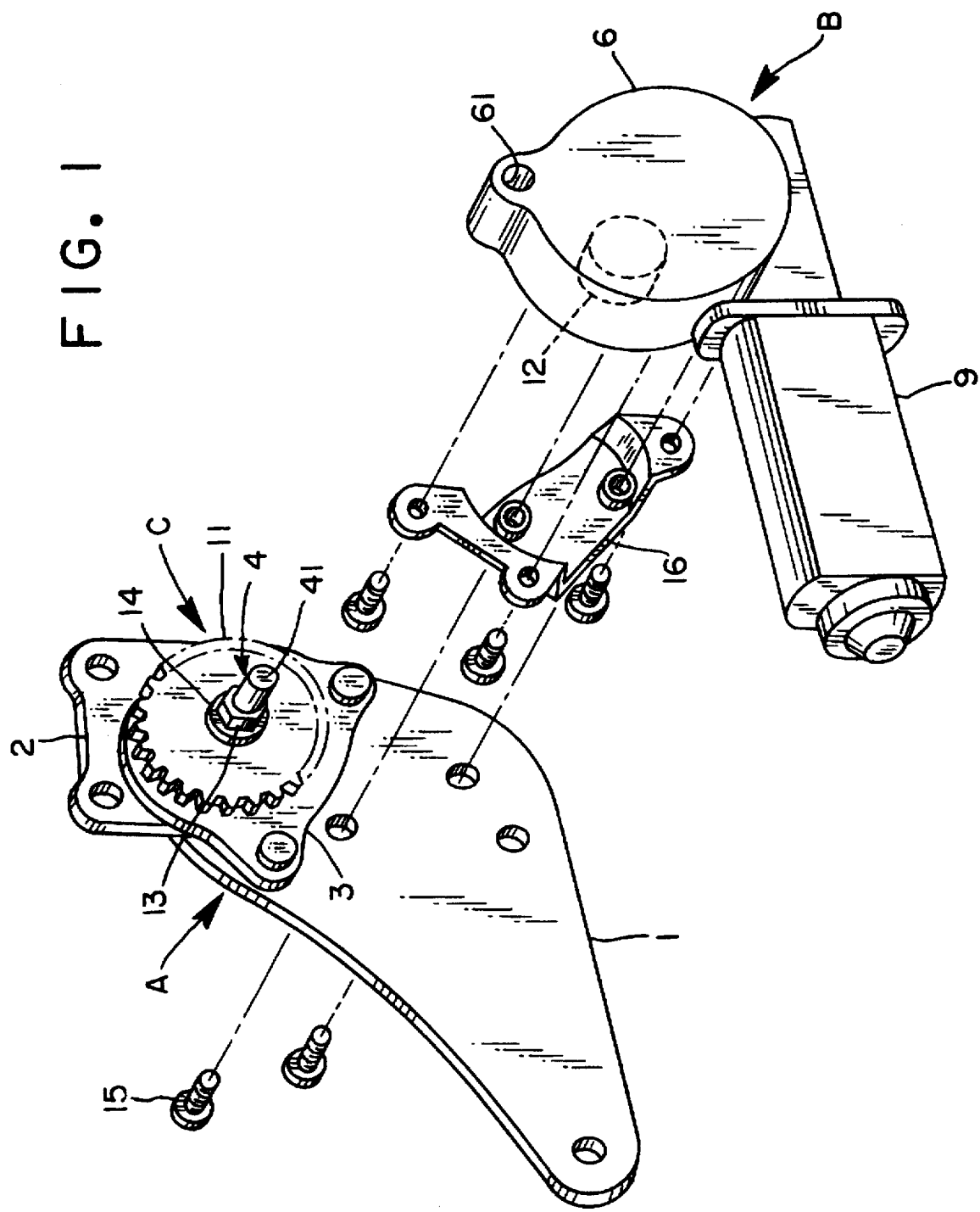
FIG. 1 is an exploded view showing a first embodiment according to the present invention.
Figure 2:
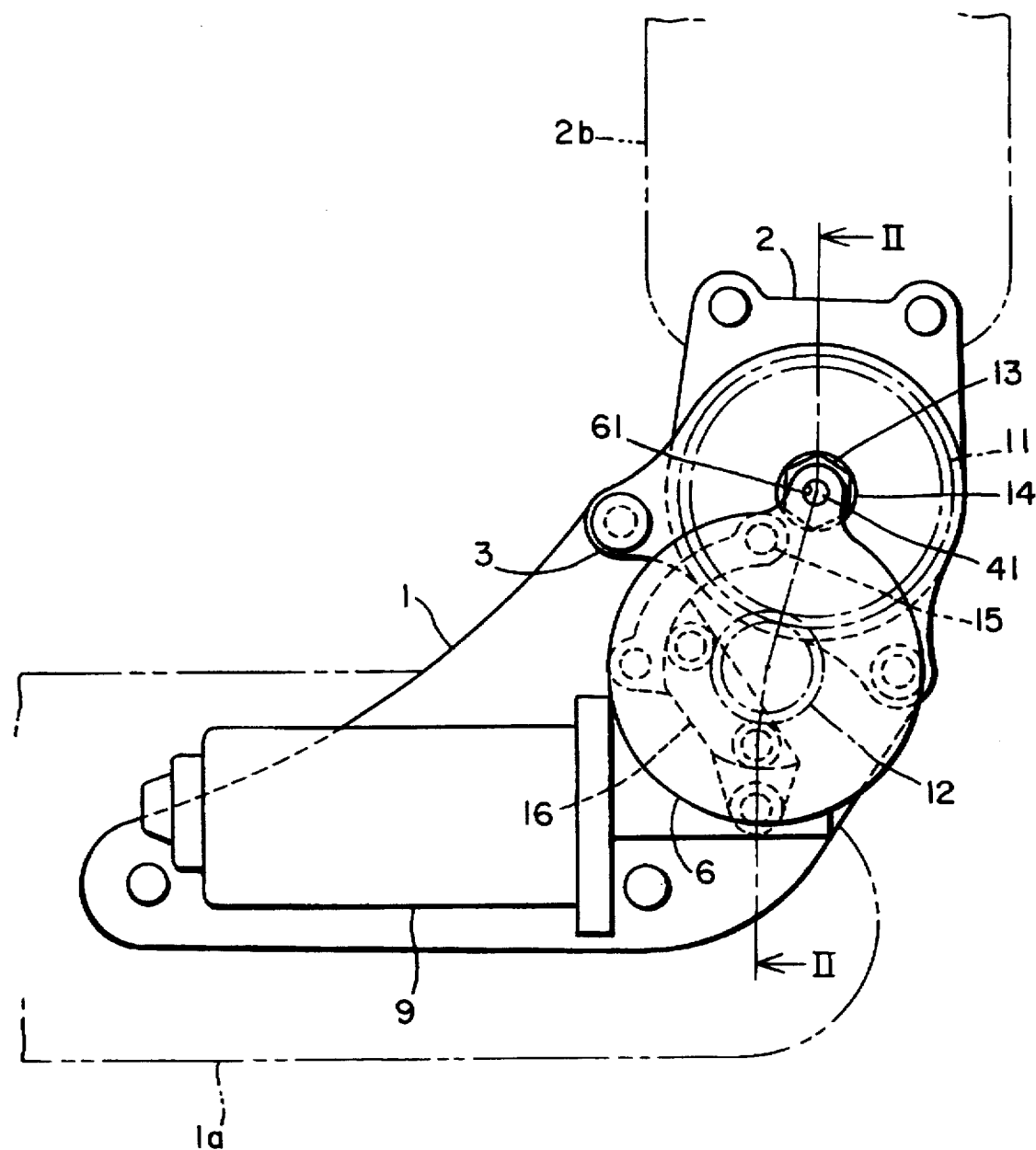
FIG. 2 is a side view of the first embodiment.
Figure 3:
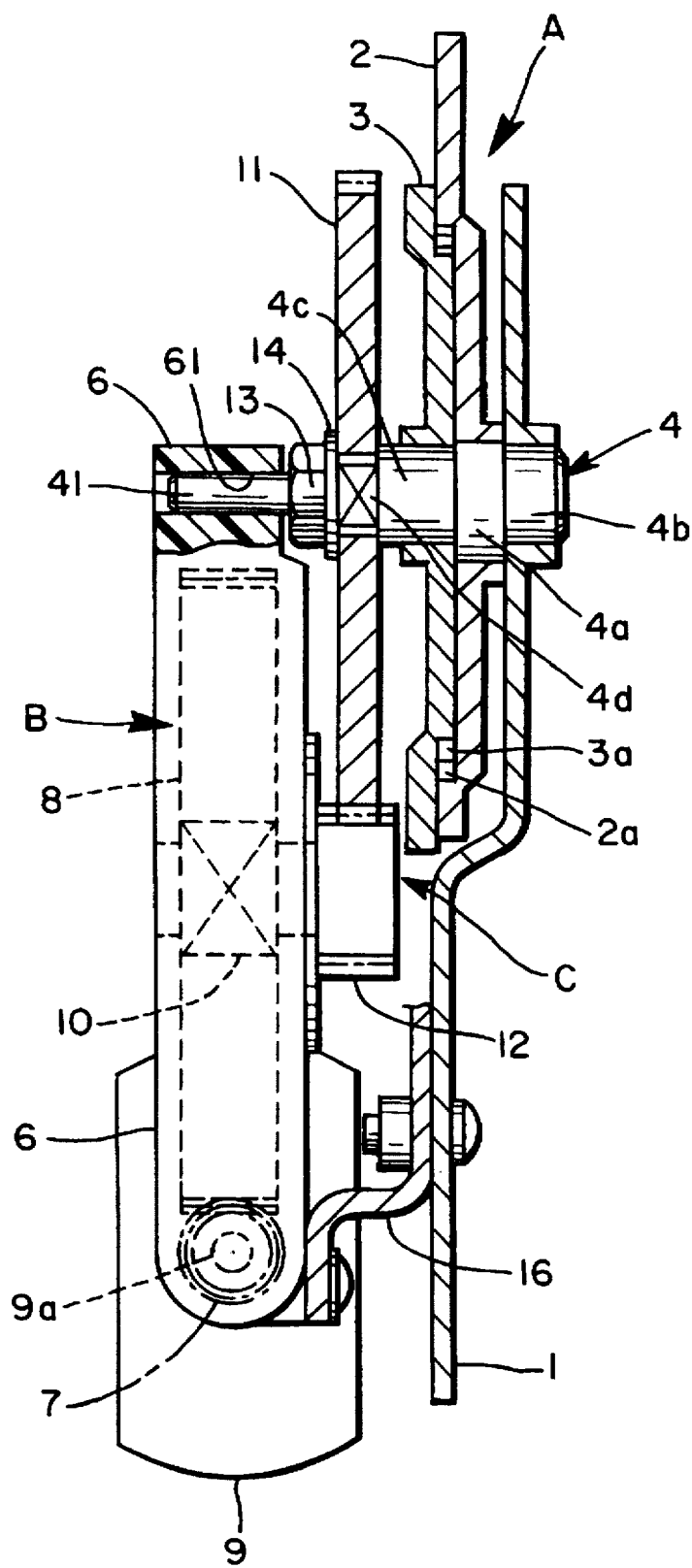
FIG. 3 is a cross-section taken along a line II—II in FIG. 2.

Refer to FIGS. 1–3, there is shown a power reclining device for a seat which includes a lower arm 1 adapted to be secured to a seat cushion frame 1a, an upper arm 2 adapted to be secured to a seat back frame 2b, and a rotating shaft 4 rotatably supporting the upper arm 2 with respect to the lower arm 1 and having an eccentric portion 4a and concentric portions 4b, 4c and 4d. The lower arm 1 and a sub-bracket 3 fixed thereto are journalled on the concentric portions 4b and 4c, and the upper arm 2 is journalled on the eccentric portion 4a.

An internal gear 2a is formed by pressing in the upper arm 2 and the sub-bracket 3 is formed by pressing with an external gear 3a. The external gear 3a has gear teeth which are smaller in number of gear teeth by one than the gear teeth in the internal gear 2a and is in partially meshing engagement with the internal gear 2a. Thus, the lower arm 1 is coupled to the upper arm 2 through the external and internal gear teeth 3a and 2a. In the illustrated example, a reclining mechanism A is composed of the lower and upper arms 1 and 2, the sub-bracket 3, and the rotating shaft 4.

A driving mechanism B is provided for operating the reclining mechanism A to rotate the upper arm 2 to the desired angular position with respect to the lower arm 1. The driving mechanism B includes at least an electric motor 9 and a reduction gear set 7 and 8 and is accommodated in a housing 6. A worm gear 7 is secured to an output shaft 9a of the electric motor 9 and a worm wheel gear 8 is rotatably supported on an intermediate shaft 10 to mesh with the worm gear 7. An end of the intermediate shaft 10 extends beyond the housing 6 and is provided with a pinion gear 12.

A coupling mechanism C for transmitting rotational torque of the electric motor 9 to the rotating shaft 4 includes the pinion gear 12 and an input gear 11 firmly secured to the concentric portion 4c of the rotating shaft 4 to mesh with the pinion gear 12. A nut 13 is fastened through an O-ring 14 to the shaft 4 to prevent axial movement of the input gear 11 along the shaft 4.

An end of the shaft 4 extends outwardly to form a hinge portion 41 coaxial with the concentric portions 4b and 4c, which is fitted into a through hole 61 of the housing 6 to rotatably support the shaft 4. Thus, the hole 61 formed on the housing 6 acts as a bearing means for supporting the input gear 11 and the shaft 4. While maintaining a predetermined dimensional relationship between an axis of the rotating shaft 4 and an axis of the intermediate shaft 10 by inserting the hinge portion 41 into the hole 61, the housing 6 can be attached to the reclining mechanism A through a bracket 16. Thus, the pinion gear 12 and the input gear 11 properly mesh with each other to operate them smoothly when the motor 9 is energized.

Figure 4:
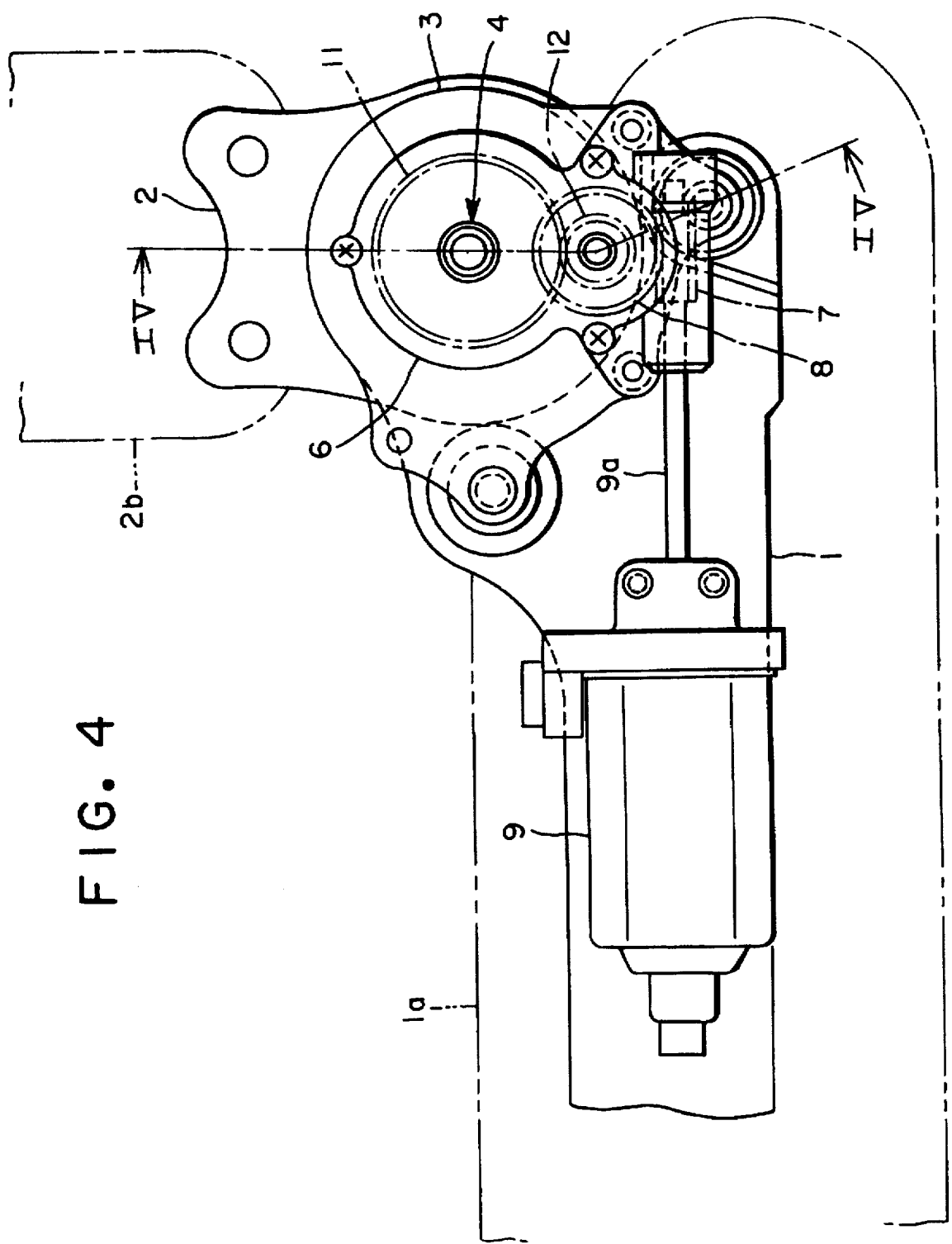
FIG. 4 is a side view of a second embodiment according to the present invention.
Figure 5:
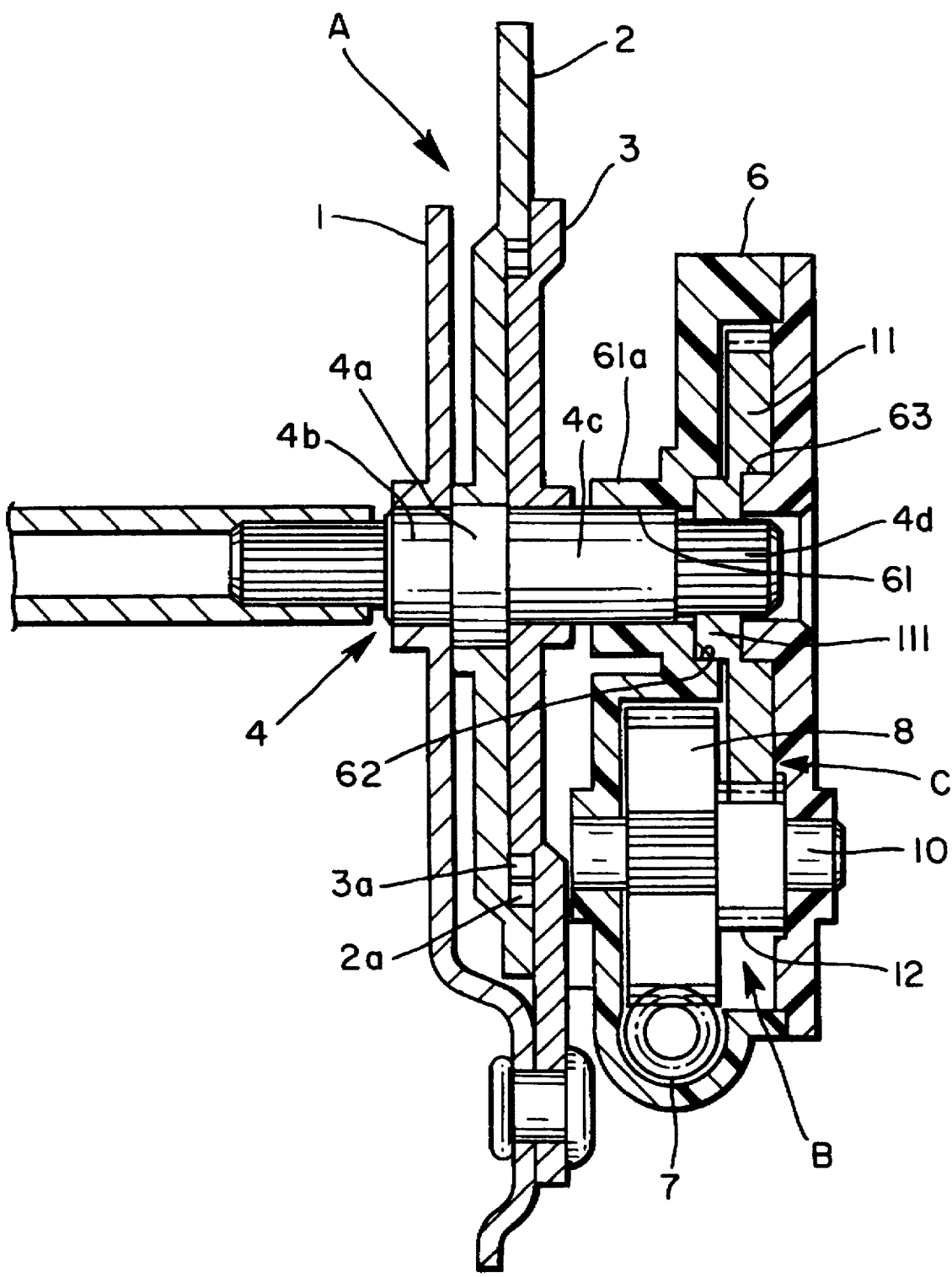
FIG. 5 a cross-section taken along a line IV—IV in FIG. 4.

A second embodiment of the present invention is illustrated in FIGS. 4 and 5, which has a basic structure similar to that described with reference to FIGS. 1-3 so that detailed description of the general structure will be omitted by showing corresponding parts by the same reference characters. The embodiment of FIGS. 4 and 5 differs from that of FIGS. 1-3 in that the input gear 11 and the pinion gear 12 are positioned in the housing 6 when the housing 6 is pre-assembled as one unit.

Both ends of the intermediate shaft 10 for supporting the worm wheel gear 8 and the pinion gear 12 are journalled on opposed side walls of the housing 6 and the input gear 11 which properly meshes with the pinion gear 12 is rotatably supported on bearing surfaces 62, 63 inside of the housing 6. The housing 6 is provided with a flange portion 61a for defining the axial hole 61. When attaching the housing 6 to the reclining mechanism A, the end of the rotating shaft 4 is inserted into the hole 61 and secured to a hub 111 of the input gear 11 through a spline. The flange portions 61a assists in increase of the holding strength of the housing 6 with respect to the reclining mechanism A and alignment with the axes of the rotating shaft 4 and the input gear 11.

As many apparently widely different embodiments of the present invention can be made without departing from the spirit and scope thereof, it is to be understood that the invention is not limited to the specific embodiments thereof except as defined in the appended claims.

What is claimed is:

1. A power reclining device for use in a seat comprising:
   a lower arm secured to a side rear portion of a seat cushion frame;
   an upper arm secured to a side lower portion of a seat back frame;
   a reclining mechanism for tilting the upper arm with respect to the lower arm including a rotatable shaft which passes through both arms, the rotatable shaft having an end and a first axis;
   a pre-assembled driving mechanism for operating the reclining mechanism including an electric motor and reduction gearing connected to the electric motor, the pre-assembled driving mechanism further including a housing member which is secured to the lower arm and in which at least said reduction gearing is housed, a hole formed on the housing member and receiving the end of the rotatable shaft, and an intermediate shaft positioned in and rotatably supported by the housing member and having a second axis;
   a pinion gear secured to the intermediate shaft and positioned in the housing member; and
   an input gear secured to the rotatable shaft and positioned in the housing member so as to be properly meshed with the pinion gear;
   wherein a predetermined distance between the first axis of the rotatable shaft and the second axis of the intermediate shaft is defined by inserting the end of the rotatable shaft into the hole of the housing member so as to attain precise meshing of the input gear with the pinion gear.

2. A power reclining device according to claim 1, further comprising a sub-bracket secured to the lower arm, and wherein the rotatable shaft has eccentric and concentric portions, and the reclining mechanism includes an internal gear provided on one of the upper arm and the sub-bracket and journalled on the eccentric portion of the rotatable shaft, and an external gear provided on the other of the upper arm and the sub-bracket and adapted for partially meshing engagement with the internal gear, the external gear being journalled on the concentric portion of the rotatable shaft.

3. A power reclining device for use in a seat comprising:
   a lower arm secured to a side rear portion of a seat cushion frame;
   an upper arm secured to a side lower portion of a seat back frame;
   a reclining mechanism for tilting the upper arm with respect to the lower arm including a rotatable shaft which passes through both arms, the rotatable shaft having a first end and a first axis;
   a pre-assembled driving mechanism for operating the reclining mechanism including an electric motor, reduction gearing connected to the electric motor, an intermediate shaft connected to the reduction gearing and having a second end and a second axis, and a housing member in which at least said reduction gearing is housed and having a first hole to support the first end of the rotatable shaft and a second hole to support the second end of the intermediate shaft;
   a pinion gear secured to the intermediate shaft and positioned near the housing member; and
   an input gear secured to the rotatable shaft and positioned near the housing member so as to be properly meshed with the pinion gear;
   wherein a predetermined distance between the first axis of the rotatable shaft and the second axis of the intermediate shaft is defined by the housing member so as to mesh precisely the input gear and the pinion gear.

4. A power reclining device according to claim 3, further comprising a sub-bracket secured to the lower arm, and wherein the rotatable shaft has eccentric and concentric portions, and the reclining mechanism includes an internal gear provided on one of the upper arm and the sub-bracket and journalled on the eccentric portion of the rotatable shaft, and an external gear provided on the other of the upper arm and the sub-bracket and adapted for partially meshing engagement with the internal gear, the external gear being journalled on the concentric portion of the rotatable shaft.

5. A power reclining device for use in a seat comprising:
   a lower arm secured to a side rear portion of a seat cushion frame, said lower arm having a sub-bracket secured thereto;
   an upper arm secured to a side lower portion of a seat back frame;
   a rotatable shaft passing through both the upper and lower arms and having eccentric and concentric portions, an end and a first axis;
   a reclining mechanism, said reclining mechanism including an internal gear provided on one of the upper arm and the sub-bracket and journalled on the eccentric portion of the rotatable shaft, and an external gear provided on another of the upper arm and the sub-bracket for partially meshing engagement with the internal gear, the external gear being journalled on the concentric portion of the rotatable shaft, for tilting the upper arm with respect to the lower arm about the rotatable shaft;
   a pre-assembled driving mechanism for operating the reclining mechanism including an electric motor and reduction gearing connected to the electric motor, the pre-assembled driving mechanism further including a support member which is secured to the lower arm, a hole formed on the support member and receiving the end of the rotatable shaft, and an intermediate shaft positioned in and rotatably supported by the support member and having a second axis;

a pinion gear secured to the intermediate shaft and positioned in the support member; and an input gear secured to the rotatable shaft and positioned in the support member so as to be properly meshed with the pinion gear;

wherein a predetermined distance between the first axis of the rotatable shaft and the second axis of the intermediate shaft is defined by the support member with the end of the rotatable shaft inserted into the hole of the support member.

6. A power reclining device for use in a seat comprising:

a lower arm secured to a side rear portion of a seat cushion frame, said lower arm having a sub-bracket secured thereto;

an upper arm secured to a side lower portion of a seat back frame;

a reclining mechanism for tilting the upper arm with respect to the lower arm, the reclining mechanism having a rotatable shaft having eccentric and concentric portions, which passes through both arms, the rotatable shaft having a first end and a first axis, includes an internal gear provided on one of the upper arm and the sub-bracket and journalled on the eccentric portion of the rotatable shaft, and an external gear provided on the other of the upper arm and the sub-bracket and adapted for partially meshing engagement with the internal gear, the external gear being journalled on the concentric portion of the rotatable shaft;

a pre-assembled driving mechanism for operating the reclining mechanism including an electric motor, reduction gearing connected to the electric motor, an intermediate shaft connected to the reduction gearing and having a second end and a second axis, and a single support member having a first hole to support the first end of the rotatable shaft and a second hole to support the second end of the intermediate shaft;

a pinion gear secured to the intermediate shaft; and an input gear secured to the rotatable shaft and meshing with the pinion gear;

wherein a predetermined distance between the first axis of the rotatable shaft and the second axis of the intermediate shaft is defined by the support member so as to mesh precisely the input gear with the pinion gear.

* * * * *